(12) United States Patent
Dang et al.

(10) Patent No.: US 6,518,327 B1
(45) Date of Patent: Feb. 11, 2003

(54) IRRADIATION PROCESS FOR MAKING OLEFIN GRAFT COPOLYMERS WITH LOW WEIGHT SIDE CHAINS

(75) Inventors: Vu A. Dang; Tam T. M. Phan, both of Bear, DE (US); Jeanine A. Smith, West Grove, PA (US); Cheng Q. Song, Wilmington, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 114 days.

(21) Appl. No.: 09/704,325

(22) Filed: Nov. 2, 2000

(51) Int. Cl.$^7$ .......................... C08F 2/45; C08F 255/02; C08F 255/04; C08F 255/06
(52) U.S. Cl. .................. 522/114; 522/113; 522/116; 522/120; 522/121; 522/126; 522/127; 522/133; 522/134; 522/136; 522/149; 522/150; 522/157; 522/161; 244/245; 244/257; 244/259; 244/301; 244/309
(58) Field of Search ................ 525/244, 245, 525/257, 259, 285, 301, 309; 522/113, 120, 116, 127, 126, 133, 121, 134, 136, 149, 150, 157, 161, 114

(56) References Cited

U.S. PATENT DOCUMENTS

| | | | |
|---|---|---|---|
| 3,493,480 A | 2/1970 | Kurada et al. ......... | 204/159.17 |
| 5,411,994 A | 5/1995 | Galli et al. ............... | 521/50.5 |
| 5,817,707 A | 10/1998 | DeNicola, Jr. et al. ..... | 522/157 |
| 5,916,974 A | 6/1999 | Song et al. ............... | 525/244 |
| 6,136,926 A | 10/2000 | Raetzch et al. ........... | 525/254 |

FOREIGN PATENT DOCUMENTS

| | | | |
|---|---|---|---|
| EP | 519341 | 12/1992 | ......... C08F/255/00 |
| EP | 849318 | 8/2000 | ............ C08K/5/32 |
| WO | 9711097 | 3/1997 | ............. C08F/2/46 |
| WO | 0015679 | 3/2000 | ......... C08F/291/18 |

Primary Examiner—James J. Seidleck
Assistant Examiner—Sanza L. McClendon

(57) ABSTRACT

Graft copolymers are prepared, in a non-oxidizing atmosphere, by (1) irradiating a particulate olefin polymer material with high energy ionizing radiation, (2) treating the irradiated olefin polymer material with at least one grafting monomer that is capable of forming side chains on the olefin polymer material, in the presence of at least one additive to control the molecular weight of the side chains of the polymerized grafting monomer selected from (a) at least one hydroxylamine derivative polymerization inhibitor, and (b) at least one thio-, nitro-, or halogen-substituted aliphatic or aromatic compound or an aliphatic or aromatic phosphine derivative, and (3) deactivating the residual free radicals in the resulting grafted olefin polymer material and removing any unreacted vinyl monomer from the material. Graft copolymers with low molecular weight side chains are produced that are easier to process and have improved internal and surface morphology.

10 Claims, No Drawings

IRRADIATION PROCESS FOR MAKING OLEFIN GRAFT COPOLYMERS WITH LOW WEIGHT SIDE CHAINS

FIELD OF THE INVENTION

This invention relates to an irradiation process for making graft copolymers of an olefin polymer material.

BACKGROUND OF THE INVENTION

Polyolefin graft copolymers can be made by any one of various methods, including forming active sites on the polyolefin either in the presence of the grafting monomers, or followed by treatment with the monomer. The grafting sites can be produced by treatment with a peroxide or other chemical compound that is a free radical polymerization initiator, or by irradiation with high energy ionizing radiation. The free radicals produced in the olefin polymer as a result of the chemical or irradiation treatment act as initiators for the polymerization of the monomer, as well as active sites for grafting. For example, U.S. Pat. No. 5,411,994 discloses making polyolefin graft copolymers by irradiating olefin polymer particles and treating with a vinyl monomer in liquid form. A non-oxidizing environment is maintained throughout the process.

Various additives have been used to modify characteristics of graft copolymers such as the morphology of the polymer particles. For example, U.S. Pat. No. 5,916,974 discloses graft polymerizing in the presence of an organic peroxide and a polymerization rate modifier (PRM) to increase the polymerization induction time on the polymer surface, consequently facilitating monomer diffusion into the interior of the polymer particles so that surface polymerization of the monomer is inhibited. Suitable PRMs include sulfur, benzoquinone and its derivatives, and hydroxylamine and its derivatives. The PRM has no significant impact on the number average and weight average molecular weight of the product.

There is a need for a process for controlling the molecular weight of the polymerized monomer side chains of polyolefin graft copolymers made from irradiated polyolefins so that low molecular weight side chains are produced, thereby improving the surface and internal morphology of the graft copolymers and improving processing without adversely affecting the overall physical properties of the graft copolymer.

SUMMARY OF THE INVENTION

The process of this invention for making graft copolymers comprises, in a substantially non-oxidizing atmosphere, (1) irradiating a particulate olefin polymer material at a temperature of about 100 to about 85° C. with high energy ionizing radiation to produce free radical sites on the olefin polymer material, (2) treating the irradiated particulate olefin polymer material at a temperature of about 250 to about 90° C. with about 0.5 to about 120 parts per hundred parts of the olefin polymer material of at least one grafting monomer that is capable of being polymerized by free radicals to form side chains on the olefin polymer material, in the presence of about 1 part to about 10,000 parts per million parts of monomer of at least one additive to control the molecular weight of the side chains of the polymerized grafting monomer, selected from the group consisting of (a) at least one hydroxylamine derivative polymerization inhibitor and (b) at least one chain transfer agent selected from the group consisting of (i) thio-substituted aliphatic and aromatic compounds, (ii) halogen-substituted aliphatic and aromatic compounds, (iii) nitro-substituted aliphatic and aromatic compounds, and (iv) aliphatic and aromatic phosphine derivatives, and (3) simultaneously or successively in optional order, (i) deactivating substantially all residual free radicals in the resultant grafted particulate olefin polymer material, and (ii) removing any unreacted vinyl monomer from the material.

Carrying out the graft polymerization reaction in the presence of at least one hydroxylamine derivative polymerization inhibitor and/or one or more of the specified chain transfer agents produced graft copolymers with low molecular weight side chains. The graft copolymer product is easier to process and has improved internal and surface morphology.

DETAILED DESCRIPTION OF THE INVENTION

The process of this invention for making graft copolymers comprises, in a substantially non-oxidizing atmosphere, (1) irradiating a particulate olefin polymer material at a temperature of about 100 to about 85° C. with high energy ionizing radiation to produce free radical sites on the olefin polymer material, (2) treating the irradiated particulate olefin polymer material at a temperature of about 25° C. to about 90° C. with about 0.5 to about 120 parts per hundred parts of the olefin polymer material of at least one grafting monomer that is capable of being polymerized by free radicals to form side chains on the olefin polymer material, in the presence of about 1 part to about 10,000 parts per million parts of monomer of at least one additive to control the molecular weight of the side chains. of the polymerized grafting monomer, selected from the group consisting of (a) at least one hydroxylamine derivative polymerization inhibitor and (b) at least one chain transfer agent selected from the group consisting of (i) thio-substituted aliphatic and aromatic compounds, (ii) halogen-substituted aliphatic and aromatic compounds, (iii) nitro-substituted aliphatic and aromatic compounds, and (iv) aliphatic and aromatic phosphine derivatives, and (3) simultaneously or successively in optional order, (i) deactivating substantially all residual free radicals in the resultant grafted particulate olefin polymer material, and (ii) removing any unreacted vinyl monomer from the material.

The propylene polymer material that is used as the backbone of the graft copolymer can be:

(1) a crystalline homopolymer of propylene having an isotactic index greater than 80, preferably about 85 to about 99;

(2) a crystalline copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;

(3) a crystalline terpolymer of propylene and two olefins selected from the group consisting of ethylene and 4–8

C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
   (a) about 10% to about 60% by weight, preferably about 15% to about 55%, of a crystalline propylene homopolymer having an isotactic index greater than 80, preferably about 85 to about 98, or a crystalline copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
   (b) about 5% to about 25% by weight, preferably about 5% to about 200%, of a copolymer of ethylene and propylene or a 4–8 C alpha-olefin that is insoluble in xylene at ambient temperature; and
   (c) about 300% to about 70% by weight, preferably about 400/o to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g,
wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa;

(5) a thermoplastic olefin comprising:
   (a) about 10% to about 60%, preferably about 20% to about 50%, of a propylene homopolymer having an isotactic index greater than 80, or a crystalline copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
   (b) about 20% to about 60%, preferably about 30% to about 500%, of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
   (c) about 3% to about 40%, preferably about 10/o to about 20%, of a copolymer of ethylene and propylene or a 4–8 C alpha-olefin that is insoluble in xylene at ambient temperature,
wherein the thermoplastic olefin has a flexural modulus of greater than 150 but less than 1200 MPa, preferably about 200 to about 1100 MPa; and most preferably about 200 to about 1000 MPa; or
   (6) an ethylene homopolymer or a copolymer of ethylene and about 0.5% to about 35% of at least one 3–12 C alpha-olefin.

Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

The ethylene polymer used as olefin polymer material (6) can be an ethylene homopolymer or a copolymer of ethylene and about 0.5% to about 35% of at least one 3–12 C alpha-olefin. The copolymer can be, for example, linear low density polyethylene, but is not limited to this type of copolymer. The density of the ethylene polymer will be determined by the end use for which the graft copolymer is intended.

Propylene homopolymer is the preferred olefin polymer backbone material.

Suitable particulate forms of the olefin polymer material used in the present method include powder, flake, granulate, spherical, and cubic. When the monomer add level is high, i.e., greater than 20 parts of monomer per hundred parts of the olefin polymer material, it is preferable for some applications to use spherical particulate forms having a weight average diameter of about 0.4–7 mm, a surface area of at least 0.1 m$^2$/g, and a pore volume fraction of at least about 0.07, and wherein more than 40% of the pores in the particle, preferably more than 50%, and most preferably more than 90%, have a diameter greater than 1 micron. The pore volume fraction is preferably at least 0.12, most preferably at least 0.20.

The olefin polymer material used as the backbone of the graft copolymer is irradiated with high energy ionizing radiation at a dose rate of about 1 to $1 \times 10^4$ megarads (Mrad) per minute for a period of time sufficient for the formation of free radical intermediates to occur, but insufficient to cause gelation of the polymer. The ionizing radiation can be of any kind, but the most practical kinds comprise electrons and gamma rays. Preferred are electrons beamed from an electron generator having an accelerating potential of 500–4000 kilovolts. Satisfactory results in terms of graft level are achieved with an ionizing radiation dose of about 0.5–12 Mrad, preferably about 2 to about 4 Mrad. The temperature during the irradiation step is preferably between about 10° to about 85° C.

The term "rad" is usually defined as that quantity of ionizing radiation that results in the absorption of 100 ergs of energy per gram of irradiated material, regardless of the source of radiation. In the usual practice of the method described herein, energy absorption from ionizing radiation is measured by-the well know conventional dosimeter, a measuring device in which a polymer film containing a radiation-sensitive dye is the energy absorption sensing means. Therefore the term "rad" means that quantity of ionizing radiation resulting in the absorption of the equivalent of 100 ergs of energy per gram of the polymer film of a dosimeter placed at the surface of the particulate olefin polymer material being irradiated.

The irradiated particles of olefin polymer material, while being maintained in a substantially non-oxidizing atmosphere (see below), are treated with at least one vinyl monomer as a liquid or in solution, optionally diluted with a suitable diluent, preferably by adding the liquid monomer or monomer solution to, and/or dispensing it onto the particulate material at a controlled rate, while the material is agitated or conveyed by any suitable means. Most preferably the liquid monomer or monomer solution is added by releasing a fine mist or spray of at least one monomer onto the irradiated particulate material while the particles are in motion, either relative to each other or to the point from which the monomer is released or dispensed. The temperature during the graft polymerization step is generally about 250 to about 90° C., preferably about 25° to about 50° C., and most preferably about 350 to about 50° C.

Solvents and diluents useful in the practice of the method of this invention are those compounds that are inert with respect to the particulate olefin polymer material and are not polymerizable by free radicals, and that have a chain transfer constant of less.than about $1 \times 10^{-3}$. Suitable solvents and diluents include ketones, such as acetone; alcohols, such as methanol; aromatic hydrocarbons, such as benzene and xylene; and cycloaliphatic hydrocarbons, such as cyclohexane.

The expression "substantially non-oxidizing" is used to describe the environment or atmosphere to which the irradiated olefin polymer material is exposed before the deactivation of residual free radicals. The active oxygen concentration, i.e., the concentration of oxygen in a form that will react with the free radicals in the irradiated material, is less than about 15%, preferably less than about 5%, and more preferably less than about 1%, by volume. The most preferred concentration of active oxygen is 0.004% or lower by volume. Within these limits, the non-oxidizing atmosphere can be any gas, or mixture of gases, that is oxidatively inert toward the free radicals in the olefin polymer material, e.g., nitrogen, argon, helium, and carbon dioxide.

The grafting monomers that are capable of being polymerized by free radicals include any monomeric vinyl compound capable of being polymerized by free radicals, wherein the vinyl radical $H_2C=CR—$, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine, and (2) unsaturated aliphatic nitriles and carboxylic acids and their esters including acrylonitrile; methacrylonitrile; acrylic acid; acrylate esters such as the methyl, ethyl, hydroxyethyl, 2-ethylhexyl, and butyl acrylate esters; methacrylic acid; methacrylate esters, such as the methyl, ethyl, butyl, benzyl, phenylethyl, phenoxyethyl, epoxypropyl, and hydroxypropyl methacrylate esters. Multiple monomers from the same or different classes can be employed. When a hydroxylamine compound is used as the molecular weight control additive, monomers containing carboxylic acid groups should not be used because they will react with the hydroxylamine compound.

The total amount of monomer or monomers used is about 0.5 parts to about 120 parts per hundred parts. of the olefin polymer material. The preferred amount depends upon which monomer is used and upon the pore volume fraction of the polyolefin backbone.

During the graft polymerization, the monomers also polymerize to form a certain amount of free or ungrafted polymer or copolymer. Any reference to "polymerized monomers" in this specification is meant to include both grafted and ungrafted polymerized monomers. The morphology of the graft copolymer is such that the olefin polymer material is the continuous or matrix phase, and the polymerized monomers, both grafted and ungrafted, are a dispersed phase. Although the weight average molecular weight of the grafted side chains of polymerized monomer cannot be measured directly, the weight average molecular weight ($M_w$) of the grafted side chains is correlated with the $M_w$ of the chains of ungrafted polymerized monomer, since the polymerization conditions are similar in both cases.

Preparation of graft copolymers by contacting a liquid vinyl monomer with an olefin polymer material that has been irradiated with high energy ionizing radiation is described in more detail in U.S. Pat. No. 5,411,994, which is incorporated herein by reference.

The graft polymerization reaction of this invention is carried out in the presence of at least one additive that controls the molecular weight of the polymerized monomer, i e., one that produces low $M_w$ side chains on the olefin polymer backbone. Low $M_w$ in this regard means lower than the $M_w$ of the polymerized monomer when the graft copolymer is made in the absence of a molecular weight control additive. The additive is present in an amount of about 1 part to about 10,000 parts per million parts of monomer, preferably about 100 parts to about 5000 parts, and most preferably about 250 parts to about 1500 parts.

The molecular weight control additive can be at least one hydroxylamine derivative polymerization inhibitor (PI) such as, for example, N,N-diethylhydroxylamine; N,N-dimethylhydroxylamine; N,N-dipropylhydroxylamine, and N-nitrosophenylhydroxyl amine. N,N-diethylhydroxylamine is preferred. More than one PI can-be used, provided that the compounds selected do not react with each other.

The molecular weight control additive can also be at least one chain transfer agent that is a thio-, nitro-, or halogen-substituted aliphatic or aromatic compound, or an aliphatic or aromatic phosphine derivative. Suitable chain transfer agents include, for example, octadecanethiol; bromotrichloromethane; triethylene glycol dimercaptan; benzene sulfide; dodecanethiol; mesityl disulfide; benzenethiol; hydrogen sulfide; carbon tetrabromide; carbon tetrachloride; tribromoacetic acid; 2,4,6-trinitroaniline; 2,4,6-trinitroanisole; 1,3,5-trinitrobenzene; phenyl phosphine, and diethyl phosphine. More than one chain transfer agent can be used, provided that the compounds selected do not react with each other. A combination of polymerization inhibitors and chain transfer agents can also be used, provided that the compounds selected do not react with each other.

When a polymerization inhibitor is used as the molecular weight control additive, the grafting efficiency is typically equal to or greater than the grafting efficiency of the control without an additive. When a chain transfer agent is used, the grafting efficiency is generally lower than that of the control without an additive. The desired grafting efficiency is determined by the end use of the product.

The graft copolymers of this invention can be formed into useful articles having improved surface and internal morphology. The surface of extrudates and films formed from the graft copolymers of this invention with low $M_w$ side chains is much smoother than the surface of products made from graft copolymers with high $M_w$ side chains. The low $M_w$ side chains also make it easier to process, i.e., homogenize, the graft copolymers of this invention, and improve the internal morphology of the graft copolymer. When viewed in cross-section, there are finer domains of grafted and ungrafted polymerized monomer that are more uniformly dispersed in the olefin polymer matrix, which provides more uniform physical properties in the finished product.

Forming of the graft copolymers can be carried out by methods known in the art including, for example, thermoforming, injection molding, sheet extrusion, profile extrusion, and blow molding. Films and fibers can also be made from these graft copolymers. The graft copolymers of this invention can also be used as compatibilizers for olefin polymers as well as blends of olefin polymers and non-olefin polymers, and as coupling agents for glass-reinforced and mineral-filled polyolefins.

Isotactic index is defined as the percent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the. isotactic index determined via extraction with boiling n-heptane, which by definition constitutes the isotactic index of the polymer.

Intrinsic viscosity is measured in decahydronaphthalene at 135° C.

The melt flow rate (MFR) of the graft copolymers was measured using ASTM D-1238 at 230° C. and 2.16 kg.

The pore volume fraction values were determined by a mercury porosimetry technique in which the volume of mercury absorbed by the particles is measured. The volume of mercury absorbed corresponds to the volume of the pores. This method is described in Winslow, N. M. and Shapiro, J. J., "An Instrument for the Measurement of Pore-Size Distribution by Mercury Penetration," ASTM Bull., TP 49, 3944 (Feb. 1959), and Rootare, H. M., "A Review of Mercury Porosimetry," 225–252 (In Hirshhom, J. S. and Roll, K. H., Eds., Advanced Experimental Techniques in Powder Metallurgy, Plenum Press, New York, 1970).

The surface area measurements were made by the B.E.T. method as described in JACS 60, 309 (1938).

Weight average molecular weight was determined by gel permeation chromatography.

The grafting efficiency $G=100\times(C_o-C)/C_o$, where C and $C_o$ are respectively the concentration (in pph of xylene) of the soluble polymerized monomer fraction and the total graft copolymer.

The percent conversion of both grafted and ungrafted monomer to polymer is equal to the weight of the total reactor product minus the weight of the propylene polymer starting material, divided by the weight of the starting monomer, and multiplied by 100.

In this specification, all parts and percentages are by weight unless otherwise noted.

EXAMPLE 1

This example shows the effect on graft copolymer properties when a hydroxylamine derivative polymerization inhibitor is present or absent. The graft copolymers were made from a propylene homopolymer to which was graft polymerized polystyrene or poly(methyl methacylate).

The propylene homopolymer used as the backbone polymer was a propylene homopolymer having a MFR (230° C., 2.16 kg) of 12 dg/min and a solubility in xylene at room temperature of 4%, and is available from Basell USA Inc.

The propylene homopolymer was passed by conveyor belt through an electron beam generated by a 1.5 MeV Dynamitron, commercially available from Radiation Dynamics Incorporated, operating at an 8 microamp beam current. The conveyor belt speed was adjusted to provide an absorbed surface dose of 2 Mrad. The atmosphere within the enclosed radiation chamber consisted essentially of nitrogen gas, the active oxygen content being maintained at less than 0.004% by volume. The chamber was at ambient temperature (about 23° C.).

The irradiated propylene homopolymer (100 parts) was added to a jacketed reactor that was purged with nitrogen. The reactor was equipped with a thermocouple, an air driven agitator, and a helical impeller. The reactor was then heated to 45° C. A mixture of styrene (20 parts per hundred parts of propylene homopolymer) (pph) and diethylhydroxylamine polymerization inhibitor (500 parts per million parts of styrene) (ppm) was added at a rate of 1 pph per minute. An exotherm occurred as polymerization took place and the temperature increased from 450 to 80° C. After monomer addition was complete, the temperature was maintained at 80° C. for one hour. The reactor was heated to 140° C. and a stream of nitrogen was introduced to remove residual monomer and thermally deactivate unreacted free radicals. After one hour, the reactor was cooled to 50° C. and the grafted polymer was removed.

When no inhibitor was used, the procedure was the same as above except that only styrene was added to the reactor.

When methyl methacrylate (MMA) was used as the grafting monomer, the graft copolymer was prepared as described above using 20 pph MMA. The only difference in the procedure was that after maintaining the temperature at 80° C. for one hour after monomer addition was complete, the reactor was heated to 100° C.

When no inhibitor was used, the procedure was the same as above except that only methyl methacrylate was added to the reactor.

After the graft copolymers were prepared, they were passed through a Haake twin screw extruder at a temperature of 450° F to homogenize the product. "Surface morphology" in Table 1 and the following tables refers to the appearance of the surface of the strand of polymer coming from the extruder.

The results of the measurement of the $M_w$ of the ungrafted chains of polymerized monomer, the MFR of the graft copolymer, and observations on the surface morphology of the strand of polymer coming from the extruder are given in Table 1.

TABLE 1

| Monomer | Monomer Add Level (pph) | Inhibitor (ppm) | Radiation Dose (Mrad) | $M_w$ | MFR (dg/min) | Surface Morphology |
|---|---|---|---|---|---|---|
| Styrene | 20 | No | 2 | 600,000 | 5.6 | Rough |
| Styrene | 20 | 500 | 2 | 200,000 | 6.2 | Smooth |
| MMA | 20 | 500 | 2 | 153,000 | 11 | Smooth |
| MMA | 20 | No | 2 | 421,000 | 10 | Rough |

The data show that when a hydroxylamine polymerization inhibitor was present, the $M_w$ of the ungrafted chains of polymerized monomer was significantly lower, the MFR was higher, and the surface morphology of the extruded polymer strand was improved compared to the control without an additive.

EXAMPLE 2

This example shows the effect on graft copolymer properties when varying amounts of N,N-diethylhydroxylamine polymerization inhibitor were used during the graft polymerization process. The graft copolymer was made from a propylene homopolymer to which polystyrene was graft polymerized.

The propylene homopolymer used as the backbone polymer had the following properties: spherical form, MFR of 10 dg/min at 230° C. and 2.16 kg, 0.44 cm³/g porosity, 96.5% insoluble in xylene at room temperature, $M_w/M_n$=5. The propylene homopolymer is commercially available from Basell USA Inc.

The propylene homopolymer was irradiated at a dose of 4 Mrad as described in Example 1.

The polystyrene-grafted propylene homopolymer was prepared as described in Example 1 except that the monomer add level was 40 pph. The amount of polymerization inhibitor added to each sample is given in Table 2.

The graft copolymer samples were extruded as described in Example 1.

The % conversion of monomer to polymer, a description of the surface morphology of the extruded polymer strand, and the $M_w$ of the chains of ungrafted polymerized monomer are shown in Table 2.

TABLE 2

| Monomer | Inhibitor (ppm) | Conversion (%) | $M_w$ | Surface Morphology |
|---|---|---|---|---|
| Styrene | No | 100 | 500,000 | Rough |
| Styrene | 250 | 81.7 | 275,000 | Rough-sandy |
| Styrene | 500 | 50 | 143,000 | Sandy |
| Styrene | 1200 | 17 | 70,000 | Smooth |

The data show that as the amount of polymerization inhibitor increased, the $M_w$ of the chains of polymerized monomer decreased and the surface morphology improved.

EXAMPLE 3

This example shows the effect on the $M_w$ of the chains of ungrafted polymerized monomer as the concentration of N,N-diethylhydroxylamine polymerization inhibitor is increased. The graft copolymer was made from a propylene homopolymer to which was grafted polystyrene.

The propylene homopolymer used as the backbone of the graft copolymer was the same as described in Example 2.

The propylene homopolymer was irradiated at 4 Mrad as described in Example 1.

The irradiated propylene homopolymer (100 parts) was added to the jacketed reactor described in Example 1 after the reactor was purged with nitrogen. The reactor was then heated to 50° C. A mixture of styrene (15 pph) and diethylhydroxylamine in the amounts shown in Table 3 in acetone (10 parts per hundred parts of propylene homopolymer) was added to the reactor at a rate of 1 pph per minute. The temperature was kept constant at 50° C. during monomer addition. After the completion of monomer addition, the temperature was kept at 50° C. for 15 min and then heated to 140° C. to thermally deactivate unreacted free radicals. A stream of nitrogen was introduced to remove residual monomer. The reactor was then cooled to 50° C. and the grafted polymer was removed from the reactor.

The graft copolymer samples were extruded as described in Example 1.

The results of the measurement of the Mw of the ungrafted chains of polymerized monomer, the grafting efficiency, and a description of the surface morphology of the extruded polymer strands are shown in Table 3.

TABLE 3

| Inhibitor (ppm) | Monomer | $M_w$ | Grafting Eff. (%) | Surface Morphology |
|---|---|---|---|---|
| 0 | Styrene | 260,000 | 95 | Rough |
| 1000 | Styrene | 125,000 | 93 | Smooth |
| 2500 | Styrene | 55,000 | 95 | Smooth |
| 5000 | Styrene | 32,000 | 95 | Smooth |
| 7500 | Styrene | 23,000 | 97 | Smooth |

The data show that as the concentration of inhibitor increased, $M_w$ decreased.

EXAMPLE 4

This example shows the effect of the type and amount of chain transfer agent (CTA) on the $M_w$ of the ungrafted polystyrene, the grafting efficiency (Gr. Eff.), and the % conversion of monomer to polymer during the preparation of a graft copolymer made from a propylene homopolymer to which was grafted polystyrene (PS).

The propylene homopolymer used as the backbone polymer was the same as in Example 2.

The propylene homopolymer was irradiated at a dose of 4 Mrad as described in Example 1.

The propylene homopolymer (100 parts) was added to the reactor described in Example 1 and the reactor was purged with nitrogen. The reactor was then heated to 50° C. A mixture of styrene (85 pph) and bromotrichloromethane in the amounts specified in Table 4 was added to the reactor at a rate of 1 pph per minute. The temperature was kept constant at 50° C. during the addition of monomer. After addition of the monomer was complete, the temperature was kept at 50° C. for 15 min and then heated to 140° C. for one hour. As the temperature reached 140° C., a stream of nitrogen was introduced to remove residual monomer and thermally deactivate unreacted free radicals. The reactor was then cooled to 50° C., and the grafted polymer was removed from the reactor.

The same procedure was used when the polymerization was run in the presence of octadecanethiol.

The results of the measurements are given in Table 4. In Table 4, pph polystyrene in the product was determined by dividing the weight of monomer converted to polymer by the weight of the propylene homopolymer used as the backbone of the graft copolymer and multiplying by 100.

TABLE 4

| CTA | $M_w$ | Gr. Eff. (%) | Conversion (%) |
| --- | --- | --- | --- |
| None | 940,000 | 67 | 97 |
| Octadecane-thiol, 50 ppm | 845,000 | 67 | 97 |
| Octadecane-thiol, 500 ppm | 760,000 | 71 | 96 |
| Bromotrichloro-methane, 50 ppm | 840,000 | 63 | 99 |
| Bromotrichloro-methane, 500 ppm | 480,000 | 44 | 99 |

The data show that the $M_w$ of the chains of polymerized monomer decreased compared to the control without an additive, when a chain transfer agent was used during the preparation of the graft copolymer.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for making graft copolymers comprising, in a substantially non-oxidizing atmosphere,
   (1) irradiating a particulate olefin polymer material at a temperature of about 10° to about 85° C. with high energy ionizing radiation to produce free radical sites on the olefin polymer material,
   (2) treating the irradiated particulate olefin polymer material at a temperature of about 25° to about 90° C. with about 0.5 to about 120 parts per hundred parts of the olefin polymer material of at least one grafting monomer that is capable of being polymerized by free radicals to form side chains on the olefin polymer material, in the presence of about 1 part to about 10,000 parts per million parts of monomer of at least one additive to control the molecular weight of the side chains of the polymerized grafting monomer so that the weight average molecular weight of the side chains is lower that the weight average molecular weight of the side chains when the graft copolymer is made in the absence of a molecular weight control additive, wherein the additive is selected from the group consisting of (a) at least one hydroxylamine derivative polymerization inhibitor and (b) at least one chain transfer agent selected from the group consisting of (i) thio-substituted aliphatic and aromatic compounds, (ii) halogen-substituted aliphatic and aromatic compounds, (iii) nitro-substituted aliphatic and aromatic compounds, and (iv) aliphatic and aromatic phosphine derivatives, and
   (3) simultaneously or successively in optional order, (i) deactivating substantially all residual free radicals in the resultant grafted particulate olefin polymer material, and (ii) removing any unreacted vinyl monomer from the material.

2. The process of claim 1 wherein the olefin polymer material is selected from the group consisting of:
   (1) a crystalline homopolymer of propylene having an isotactic index greater than 80;
   (2) a crystalline copolymer of propylene and an olefin selected from the group consisting of ethylene and 4–10 C alpha-olefins, provided that when the olefin is ethylene, the maximum polymerized ethylene content is about 10%, and when the olefin is a 4–10 C alpha-olefin, the maximum polymerized content thereof is about 20% by weight, the copolymer having an isotactic index greater than 85;
   (3) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
   (4) an olefin polymer composition comprising:
      (a) about 10% to about 60% by weight of a crystalline propylene homopolymer having an isotactic index greater than 80 or a crystalline copolymer of monomers selected from the group consisting of (i) propylene and ethylene, (ii) propylene,ethylene and a 4–8 C alpha-olefin, and (iii) propylene and a 4–8 C alpha-olefin, the copolymer having a polymerized propylene content of more than 85% by weight and an isotactic index greater than 85;
      (b) about 5% to about 25% by weight of a copolymer of ethylene and propylene or a 4–8 C alpha-olefin that is insoluble in xylene at ambient temperature; and
      (c) about 30% to about 70% by weight of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4 and the composition is prepared by polymerization in at least two stages and has a flexural modulus of less than 150 MPa;

(5) a thermoplastic olefin comprising:

(a) about 10% to about 60% of a propylene homopolymer having an isotactic index greater than 80, or a crystalline copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;

(b) about 20% to about 60% of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa; and (6) an ethylene polymer selected from the group consisting of (a) an ethylene homopolymer and (b) a copolymer of ethylene and about 0.5% to about 35% of a 3–12 C alpha-olefin.

3. The process of claim 2 wherein the olefin polymer material is a propylene homopolymer.

4. The process of claim 1 wherein the hydroxylamine derivative is selected from the group consisting of (a) N,N-diethylhydroxylamine, (b) N,N-dimethylhydroxylamine, (c) N,N-dipropylhydroxylamine, and (d) N-nitrosophenylhydroxylamine.

5. The process of claim 4 wherein the hydroxylamine derivative is N,N-diethylhydroxylamine.

6. The process of claim 1 wherein the chain transfer agent is a thio-substituted aliphatic compound.

7. The process of claim 6 wherein the chain transfer agent is octadecanethiol.

8. The process of claim 6 wherein the chain transfer agent is triethylene glycol dimercaptan.

9. The process of claim 1 wherein the chain transfer agent is a halogen-substituted aliphatic compound.

10. The process of claim 9 wherein the chain transfer agent is bromotrichloromethane.

* * * * *